Feb. 16, 1960   R. SARDESON   2,925,246
VALVE
Filed Jan. 2, 1958

INVENTOR
ROBERT SARDESON
Caswell & Lagaard
ATTORNEYS

United States Patent Office 2,925,246
Patented Feb. 16, 1960

2,925,246

VALVE

Robert Sardeson, Mound, Minn., assignor to Pako Corporation, Minneapolis, Minn., a corporation of Delaware Application January 2, 1958, Serial No. 706,691

11 Claims. (Cl. 251—191)

The herein disclosed invention relates to valves and has for an object to provide a valve which will effect an exceedingly tight closure.

Another object of the invention resides in providing a valve which will operate for an exceedingly long time without attention.

A still further object of the invention resides in providing a valve capable of being used for chemicals and other materials which may cause injury to metals.

An object of the invention resides in providing a valve in which leakage past the valve member and valve stem is greatly reduced.

An object of the invention resides in constructing the valve with a valve body having a bore therein and inlet and outlet passageways intersecting said bore and communicating with the chamber therein and in further forming the bore with surfaces encircling said inlet and outlet and with a bottom.

Another object of the invention resides in providing a cylindrical valve member movable in said bore and constructed of resilient material, said valve member upon being forced against said bottom expanding and forming a tight seal with the denoted surfaces of the body.

An object of the invention resides in attaching a valve stem to the valve member and utilizing a threaded cap secured to the body and engaged by said valve stem for advancing the valve member along said bore.

An object of the invention resides in constructing the valve member at the end opposite the bottom of the body with a sleeve having a flange extending inwardly thereof at its free end and forming an annular recess encircling said valve stem.

Another object of the invention resides in utilizing a torsion coil spring disposed within said recess and adapted to exert a radial force tending to expand the sleeve and to cause the same to fit tightly against the surface of the bore.

Another object of the invention resides in constructing the sleeve with an annular bead encircling the same and engaging the surface of the bore to further prevent leakage past the valve member.

Other objects of the invention reside in the novel combination and arrangement of parts and in the details of construction hereinafter illustrated and/or described.

Figure 1:
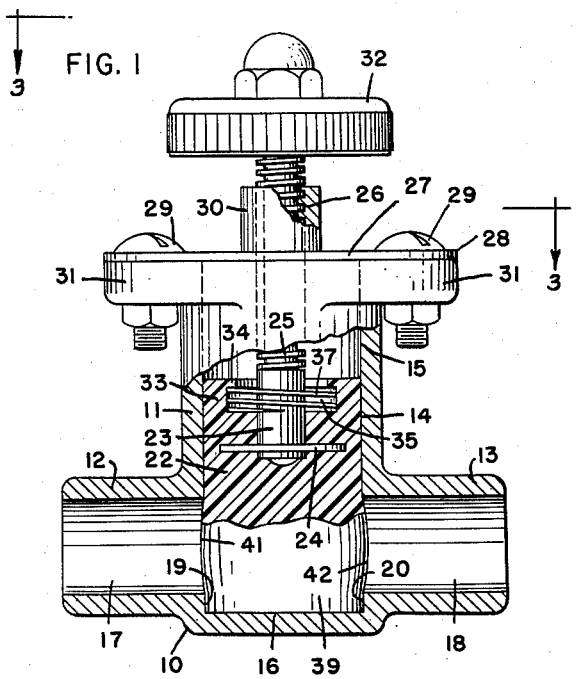
Fig. 1 is an elevational view partly in section of a valve illustrating an embodiment of the invention.
Figure 3:
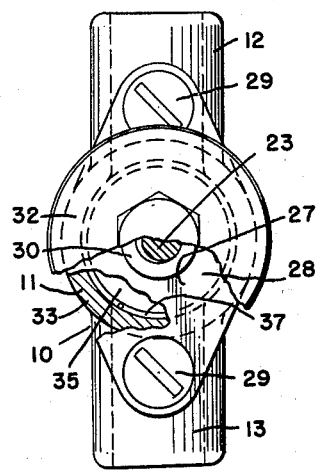
Fig. 3 is a plan sectional view taken substantially on line 3—3 of Fig. 1.
Figure 2:
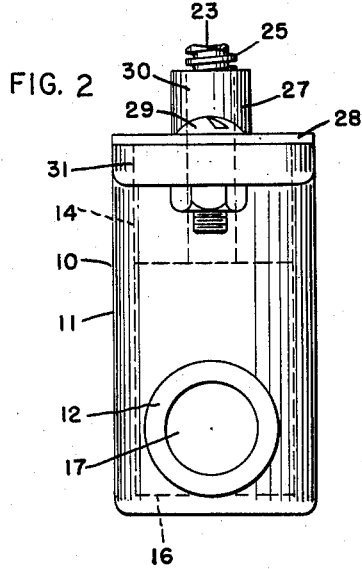
Fig. 2 is an end elevational view of a portion of the structure shown in Fig. 1.

The invention comprises a valve body 10, T-shaped in form, and having a cylindrical body portion 11 with two bosses 12 and 13 extending outwardly therefrom. The body portion 11 is formed with a bore 14 providing a cylindrical surface 15. The bore 14 is open at one end and the body portion 11 is provided with a bottom 16 at the other end of bore 14. The bosses 12 and 13 are provided with inlet and outlet passageways 17 and 18 and which intersect the bore 14. It will be noted that the passageways 17 and 18 are disposed above the bottom 16 so that annular surfaces 19 and 20 are provided which form part of the cylindrical surface 15 and which encircle the passageways 17 and 18.

The body 10 is preferably constructed of some plastic material such as rubber, Bakelite, or the like, and which is not subject to the action of chemicals with which the valve is to be used. The bosses 12 and 13 may be threaded to receive conduit fittings or the same may be simply used as nipples and to which flexible hoses may be connected in the customary manner by hose clamps.

Slidably mounted in the bore 14 is a valve member 22 which is constructed of rubber or some other flexible, resilient material. This valve member is cylindrical in form and is adapted to slide snugly along the bore 14 of the body 10. Embodied in the end of the valve member 22 opposite the bottom 16 is a valve stem 23 which extends for some distance into said valve member and which projects outwardly therefrom. This valve stem is securely attached to the valve member by means of a washer 24 which is riveted to the end of said valve stem and which projects outwardly therefrom. This washer is likewise imbedded in the valve member 22. The open end of the body 10 is closed by means of a cap 27 having a boss 30 and a flange 28 extending outwardly therefrom. The valve stem 23 is constructed with threads 25 which screw into corresponding threads 26 formed in the boss 30. The cap 26 is secured to the body by means of bolts 29 which extend through the flange 28 and through lugs 31 issuing outwardly from the body portion 11. The end of the stem 23 has attached to it a knob 32 and by means of which the same may be rotated to advance the valve member 22 along the bore 14.

Figure 4:
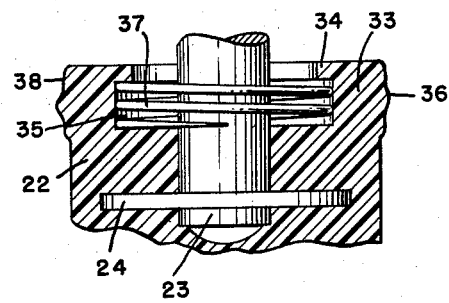
Fig. 4 is a fragmentary elevational-sectional view of the valve member removed from the valve.

The valve member 22 is provided with a sleeve 33 integral therewith and extending outwardly from said valve member and encircling the valve stem 23. This sleeve at its outer end has an inwardly disposed flange 34 forming within said sleeve and valve member an annular recess 35. Encircling the sleeve 33 is a bead 36 formed of the same material as the sleeve and which is integral therewith. Disposed within the recess 35 is a torsion coil spring 37 which is normally of a diameter greater than the diameter of the recess 35. When the ends of this coil spring are moved circumferentially relative to one another in one direction, the diameter of the coil becomes less and the coil may be inserted past the flange 34 and into the recess 35. When released, the convolutions of the coil spring move radially, increasing the diameter of the spring and causing the spring to exert radial forces in an outward direction on the sleeve 33. This expands the sleeve and forms on the same a bulge 38 shown in Fig. 4. When the valve member is inserted into the bore 14, the bulge 38 is compressed to snugly fit against the surface 15 of bore 14, and likewise the bead 36 is compressed into the surface of the bulge 38. By means of this construction, the portion of the valve member 22 opposite the bottom 16 is caused to tightly fit the bore 14 and to prevent leakage past the said valve member.

The valve is used in the customary manner. When the end 39 of the valve member 22 is forced against the bottom 16, the portions 41 and 42 of said valve member opposite the intersections of the passageways 17 and 18 with the bore 14 are forced outwardly and caused to engage the surfaces 19 and 20 of the bore to effect a tight seal between the said passageways 17 and 18. When the knob 32 is turned in a manner to release the pressure against the bottom 16, the portions 41 and 42 recede and the valve member may be slid along the surface 15 of bore 14. During such movement, the bulge 38 and the bead 36 cause the portion of the valve member opposite the end 39 to snugly engage the surface 15 to prevent leakage past said valve member and outwardly of the valve body 10 through the space between the threads 25 and 26.

The advantages of the invention are apparent. The valve can be used for chemicals ordinarily effecting metals and similar substances. An exceedingly tight closure is effected when the valve member is urged against the bottom of the body. Due to the resilience of the valve member and also that of the spring, an effective seal is provided between the valve member and the bore which prevents leakage out of the valve. Even if the valve member looses its resilience through age the spring disposed within the recess in the valve member maintains the valve member in tight contact with the surface of the bore.

Changes in the specific form of the invention, as herein described, may be made within the scope of what is claimed without departing from the spirit of the invention.

Having described the invention, what is claimed as new and desired to be protected by Letters Patent is:

1. In a valve comprising a body having a longitudinal bore intersected by inlet and outlet passageways and forming a cylindrical surface having marginal portions encircling said passageways, a bottom at the end of said bore, a threaded cap attached to said body at the end of said bore opposite said bottom, a valve stem screwed into said cap and extending into said bore, a cylindrical valve member slidable in said bore and constructed of flexible resilient material, attaching means acting between said valve stem and valve member and procuring movement of said valve member along said bore upon rotation of said valve stem relative to said cap, said valve stem causing compression of said valve member to urge the same into engagement with the marginal portions of the cylindrical surface of the body when forced against said bottom, the combination of a cylindrical flexible sleeve at the end of said valve member opposite said bottom integral therewith, and engaging said surface, said sleeve and valve member forming a unitary structure and resilient means disposed within said sleeve and expanded radially to urge the outer surface of said sleeve into engagement with the cylindrical surface of said body.

2. In a valve comprising a body having a longitudinal bore intersected by inlet and outlet passageways and forming a cylindrical surface having marginal portions encircling said passageways, a bottom at the end of said bore, a threaded cap attached to said body at the end of said bore opposite said bottom, a valve stem screwed into said cap and extending into said bore, a cylindrical valve member slidable in said bore and constructed of flexible resilient material, attaching means acting between said valve stem and valve member and procuring movement of said valve member along said bore upon rotation of said valve stem relative to said cap, said valve stem causing compression of said valve member to urge the same into engagement with the marginal portions of the cylindrical surface of the body when forced against said bottom, the combination of a cylindrical flexible sleeve at the end of said valve member opposite said bottom integral therewith, and engaging said surface, said sleeve and valve member forming a unitary structure and an annular spring within said sleeve and expanded radially to urge the outer surface of said sleeve into engagement with the cylindrical surface of said body.

3. In a valve comprising a body having a longitudinal bore intersected by inlet and outlet passageways and forming a cylindrical surface having marginal portions encircling said passageways, a bottom at the end of said bore, a threaded cap attached to said body at the end of said bore opposite said bottom, a valve stem screwed into said cap and extending into said bore, a cylindrical valve member slidable in said bore and constructed of flexible resilient material, attaching means acting between said valve stem and valve member and procuring movement of said valve member along said bore upon rotation of said valve stem relative to said cap, said valve stem causing compression of said valve member to urge the same into engagement with the marginal portions of the cylindrical surface of the body when forced against said bottom, the combination of a cylindrical flexible sleeve at the end of said valve member opposite said bottom integral therewith, encircling said valve stem and engaging said surface, said sleeve and valve member forming a unitary structure, an inwardly extending flange formed on the end of said sleeve and forming with said valve member and sleeve an annular recess within said sleeve and resilient means disposed within said recess and confined therein by said flange said resilient means being expanded radially to urge the outer surface of said sleeve into engagement with the cylindrical surface of said body.

4. In a valve comprising a body having a longitudinal bore intersected by inlet and outlet passageways and forming a cylindrical surface having marginal portions encircling said passageways, a bottom at the end of said bore, a threaded cap attached to said body at the end of said bore opposite said bottom, a valve stem screwed into said cap and extending into said bore, a cylindrical valve member slidable in said bore and constructed of flexible resilient material, attaching means acting between said valve stem and valve member and procuring movement of said valve member along said bore upon rotation of said valve stem relative to said cap, said valve stem causing compression of said valve member to urge the same into engagement with the marginal portions of the cylindrical surface of the body when forced against said bottom, the combination of a cylindrical flexible sleeve at the end of said valve member opposite said bottom integral therewith, encircling said valve stem and engaging said surface, said sleeve and valve member forming a unitary structure, an inwardly extending flange formed on the end of said sleeve and forming with said valve member and sleeve an annular recess within said sleeve and a torsion coil spring disposed within said recess, and being torsionally expanded to engage said sleeve to urge said sleeve radially outwardly into engagement with the cylindrical surface of said body.

5. In a valve comprising a body having a longitudinal bore intersected by inlet and outlet passageways and forming a cylindrical surface having marginal portions encircling said passageways, a bottom at the end of said bore, a threaded cap attached to said body at the end of said bore opposite said bottom, a valve stem screwed into said cap and extending into said bore, a cylindrical valve member slidable in said bore and constructed of flexible resilient material, attaching means acting between said valve stem and valve member and procuring movement of said valve member along said bore upon rotation of said valve stem relative to said cap, said valve stem causing compression of said valve member to urge the same into engagement with the marginal portions of the cylindrical surface of the body when forced against said bottom, the combination of a resilient cylindrical sleeve at the end of said valve member opposite said bottom and integral therewith, said sleeve and valve member forming a unitary structure, said sleeve engaging the cylindrical surface of said body, and resilient means disposed within said sleeve and expanded radially to urge the outer surface of said sleeve into engagement with the cylindrical surface of said body.

6. In a valve comprising a body having a longitudinal bore intersected by inlet and outlet passageways and forming a cylindrical surface having marginal portions encircling said passageways, a bottom at the end of said bore, a threaded cap attached to said body at the end of said bore opposite said bottom, a valve stem screwed into said cap and extending into said bore, a cylindrical valve member substantially the same diameter as said bore slidable in said bore and constructed of flexible resilient material, attaching means acting between said valve stem and valve member and procuring movement of said valve member along said bore upon rotation of said valve stem relative to said cap, said valve stem causing compression of said valve member to urge the same into engagement with the marginal portions of the cylindrical surface of the body when forced against said bottom, the combination of a cylindrical flexible sleeve at the end of said valve member opposite said bottom integral therewith, and engaging said surface, said sleeve and valve member forming a unitary structure, and a bead encircling said sleeve and integral therewith, said bead normally before insertion of the valve member in the bore projecting outwardly beyond the major surface of said valve member and being normally of greater diameter than the diameter of said bore, said sleeve being resilient and when disposed within said bore being compressed to the same diameter as said valve member and bore and having a tendency to forcibly engage the cylindrical surface of said body.

7. In a valve comprising a body having a longitudinal bore intersected by inlet and outlet passageways and forming a cylindrical surface having marginal portions encircling said passageways, a bottom at the end of said bore, a threaded cap attached to said body at the end of said bore opposite said bottom, a valve stem screwed into said cap and extending into said bore, a cylindrical valve member slidable in said bore and constructed of flexible resilient material, attaching means acting between said valve stem and valve member and procuring movement of said valve member along said bore upon rotation of said valve stem relative to said cap, said valve stem causing compression of said valve member to urge the same into engagement with the marginal portions of the cylindrical surface of the body when forced against said bottom, the combination of a cylindrical flexible sleeve at the end of said valve member opposite said bottom integral therewith, and engaging said surface, said sleeve and valve member forming a unitary structure and a bead encircling said body and integral therewith, said bead normally before insertion of the valve member in the bore projecting outwardly beyond the major surface of said valve member and being normally of greater diameter than the diameter of said bore, said sleeve being resilient and having a tendency to urge said bead into engagement with the cylindrical surface of said body, and resilient means disposed within said sleeve and expanded radially to urge the outer surface of said sleeve into engagement with the cylindrical surface of said body.

8. A resilient valve member for a sliding type valve constructed of resilient material and cylindrical in form, a cylindrical flexible sleeve at one end of said valve member integral therewith, said sleeve and valve member forming a unitary structure and resilient means disposed within said sleeve and expanded radially to urge the outer surface of said sleeve outwardly.

9. A resilient valve member for a sliding type valve constructed of resilient material and cylindrical in form, a cylindrical flexible sleeve at one end of said valve member integral therewith, said sleeve and valve member forming a unitary structure, a torsion coil spring disposed within said sleeve and urging said sleeve radially outwardly.

10. A resilient valve member for a sliding type valve constructed of resilient material and cylindrical in form, a cylindrical flexible sleeve at one end of said valve member integral therewith, said sleeve and valve member forming a unitary structure, an inwardly extending flange formed on the end of said sleeve and forming with said valve member and sleeve an annular recess within said sleeve and resilient means disposed within said recess and confined therein by said flange, said resilient means being expanded radially and engaging said sleeve and urging said sleeve outwardly.

11. In a valve comprising a body having a longitudinal bore intersected by inlet and outlet passageways and forming a cylindrical surface, a cylindrical valve member slidable in said bore and constructed of flexible resilient material, means acting on said valve member and procuring radial expansion thereof to urge said valve member into engagement with the surface of said bore to effect a seal between said inlet and outlet passageways when the valve member is moved along said bore, the combination of a cylindrical flexible sleeve at the end of said valve member, integral therewith and engaging said surface, said sleeve and valve member forming a unitary structure and resilient means disposed within said sleeve and expanded radially to urge the outer surface of said sleeve into engagement with the cylindrical surface of said body.

References Cited in the file of this patent

UNITED STATES PATENTS

| 1,885,121 | Loweke | Nov. 1, 1932 |
| 2,031,531 | Fiese | Feb. 18, 1936 |
| 2,359,369 | Kunkel | Oct. 3, 1944 |
| 2,449,481 | Hufferd et al. | Sept. 14, 1948 |
| 2,756,773 | Bauerlein | July 31, 1956 |

FOREIGN PATENTS

| 93,300 | Sweden | Nov. 15, 1938 |
| 648,678 | Great Britain | Jan. 10, 1951 |